E. MILLER.
Thill-Coupling Jack.
No. 223,940. Patented Jan. 27, 1880.
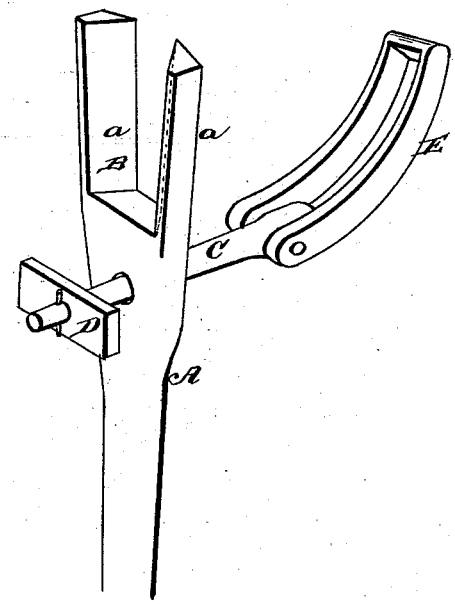
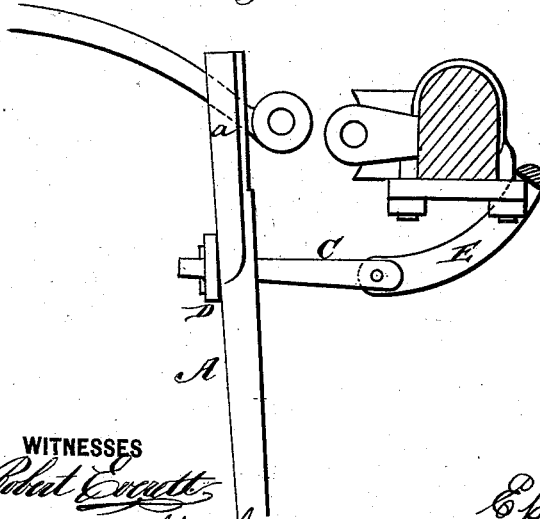
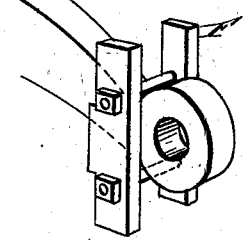
WITNESSES
INVENTOR
ATTORNEYS

UNITED STATES PATENT OFFICE.

EPHRAIM MILLER, OF SPRING CITY, PENNSYLVANIA, ASSIGNOR OF ONE-HALF OF HIS RIGHT TO CASPER S. FRANCES, OF SAME PLACE.

THILL-COUPLING JACK.

SPECIFICATION forming part of Letters Patent No. 223,940, dated January 27, 1880.

Application filed November 29, 1879.

*To all whom it may concern:*

Be it known that I, EPHRAIM MILLER, of Spring City, in the county of Chester and State of Pennsylvania, have invented certain new and useful Improvements in Devices for Coupling Shafts and Poles; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a perspective of my device for coupling shaft and pole. Fig. 2 is a side elevation view of the same, and Fig. 3 is a perspective detail view.

My present invention relates to a device for coupling the shafts and poles of vehicles; and it consists in a forked lever with beveled prongs for embracing the shaft and a rod adjustably connected at one end with the lever and provided at its other end with a curved hinge-clasp adapted to embrace a nut upon the axle, whereby, after the said parts are properly adjusted in position, the lever may be operated so as to draw the thill toward the axle and force its head into the eye of the clip, all as hereinafter more fully described, and particularly pointed out in the claim.

Referring by letter to the drawings, A designates the lever, which is formed with prongs *a a;* and B, the inner beveled sides of these prongs, which embrace the shaft, the said bevels adapting the prongs to the taper of the shaft, and also preventing the paint and varnish from being scraped therefrom during the process of coupling, which will be presently described.

C designates a rod, which is adjustably connected with the lever A, the mode of connection herein employed being simply to pass the rod through a hole in the lever and secure upon the end of the rod a nut, D, so that the length of rod between the lever and a hinge-clasp, E, may be varied by adjusting the said nut upon a screw-threaded portion of the rod. The clasp E, which is hinged to the above-described rod, consists of a curved or semicircular frame adapted to embrace either one or both of the nuts which are employed to secure the clip upon the axle.

The arrangement of the several parts preparatory to coupling is clearly illustrated in Fig. 2, in which the prongs of the lever are represented as embracing the shaft and the hinged clasp as embracing one of the nuts.

In order to now bring the thill toward the axle and to force the head thereof into the eye of the clip, the operator will grasp the handle of the lever and draw it forward or away from the axle, whereby the thill will be forced by its shorter arm toward the axle, and the thill-head caused to couple with the eye of the clip.

The prongs are prevented from slipping off the thill by reason of its enlarged end or head; but in some instances, where the head is insufficient for such purpose, I slip upon the shackle a small frame, F, composed of two bars connected together by rods and nuts. This frame serves as an abutment for the prongs, and is of great advantage where the head does not project out from the sides of the shackle. The projecting parts upon the upper and under side of the shackle will arrest the frame, since the rods thereof strike against the same, and hence the two bars will constitute bearings for the prongs of the lever.

I am aware that levers provided with slotted pivoted clamps have been used to couple shafts and poles of vehicles, and these I do not broadly claim.

What I claim, and desire to secure by Letters Patent, is—

The herein-described device for coupling shafts, the same comprising a forked lever with beveled prongs, a rod adjustably connected at one end with the lever, and provided at its remaining end with a curved hinge-clasp adapted to embrace a nut upon the axle, all substantially as shown and specified.

In testimony that I claim the above I have hereunto subscribed my name in the presence of two witnesses.

EPHRAIM MILLER.

Witnesses:
 HOSEA SHEEDER,
 DAVID FINKBINER.